US010352023B2

(12) United States Patent
Frank et al.

(10) Patent No.: US 10,352,023 B2
(45) Date of Patent: Jul. 16, 2019

(54) POWER CONNECTION DEVICE

(71) Applicant: VOLVO CONSTRUCTION EQUIPMENT AB, Eskilstuna (SE)

(72) Inventors: Bobbie Frank, Eskilstuna (SE); Joacim Holmqvist, Eskilstuna (SE); Jimmy Kämäräinen Bergstrand, Eskilstuna (SE)

(73) Assignee: Volvo Construction Equipment AB, Eskilstuna (SE)

( * ) Notice: Subject to any disclaimer, the term of this patent is extended or adjusted under 35 U.S.C. 154(b) by 259 days.

(21) Appl. No.: 15/319,404

(22) PCT Filed: Jun. 17, 2014

(86) PCT No.: PCT/SE2014/000082
§ 371 (c)(1),
(2) Date: Dec. 16, 2016

(87) PCT Pub. No.: WO2015/195000
PCT Pub. Date: Dec. 23, 2015

(65) Prior Publication Data
US 2017/0121937 A1    May 4, 2017

(51) Int. Cl.
*H02G 11/00* (2006.01)
*E02F 9/08* (2006.01)
(Continued)

(52) U.S. Cl.
CPC .............. *E02F 9/0858* (2013.01); *B60L 9/00* (2013.01); *E02F 3/325* (2013.01); *E02F 9/006* (2013.01);
(Continued)

(58) Field of Classification Search
CPC .... H02G 11/00; H02G 11/003; H02G 11/006; H02G 11/02
See application file for complete search history.

(56) References Cited

U.S. PATENT DOCUMENTS 4,587,383 A * 5/1986 Stoldt .................. B60M 7/00
191/12 R
7,883,046 B2 * 2/2011 Inman ................. B65H 75/38
242/390.8

FOREIGN PATENT DOCUMENTS

CN     102171061 A    8/2011
CN     103459725 A    12/2013
(Continued)

OTHER PUBLICATIONS

Chinese Official Action (dated Aug. 24, 2018) for corresponding Chinese App. 201480079931.3.
International Search Report (dated Feb. 23, 2015) for corresponding International App. PCT/SE2014/000082.
European Official Action (dated Jan. 10, 2018) for corresponding European App. EP14894893.

*Primary Examiner* — Robert J McCarry, Jr.
(74) *Attorney, Agent, or Firm* — WRB-IP LLP

(57) ABSTRACT

A power connection device is provided for transmitting electric power from an external power source to a working machine). The working machine has an undercarriage and a superstructure, and the undercarriage and the superstructure are pivotable relative to each other about a substantially vertical pivot axis. The power connection device includes a first power conductor member which is adapted to be pivotally arranged relative to the undercarriage and the superstructure about the substantially vertical pivot axis.

16 Claims, 5 Drawing Sheets

(51) Int. Cl.
   *E02F 3/32*    (2006.01)
   *E02F 9/20*    (2006.01)
   *H01R 39/00*   (2006.01)
   *E02F 9/00*    (2006.01)
   *E02F 9/12*    (2006.01)
   *B60L 9/00*    (2019.01)
   *H01R 39/06*   (2006.01)
   *H01R 39/64*   (2006.01)
   *E02F 3/96*    (2006.01)

(52) U.S. Cl.
   CPC .............. *E02F 9/121* (2013.01); *E02F 9/123* (2013.01); *E02F 9/20* (2013.01); *E02F 9/207* (2013.01); *H01R 39/00* (2013.01); *H01R 39/06* (2013.01); *H01R 39/64* (2013.01); *B60W 2510/242* (2013.01); *E02F 3/961* (2013.01)

(56) References Cited

FOREIGN PATENT DOCUMENTS

| | | | |
|---|---|---|---|
| EP | 2602890 | A2 | 6/2013 |
| EP | 2645533 | A1 | 10/2013 |
| JP | 3013630 | U | 7/1995 |
| JP | 2012140808 | A | 7/2012 |
| JP | 2012225048 | A | 11/2012 |
| WO | 2004101134 | A1 | 11/2004 |
| WO | 2010085184 | A1 | 7/2010 |
| WO | 2013162448 | A1 | 10/2013 |
| WO | 2013146221 | A1 | 12/2015 |

* cited by examiner

POWER CONNECTION DEVICE

BACKGROUND AND SUMMARY

The invention relates to a power connection device for a working machine and a working machine comprising a power connection device.

The invention can be applied on different types of working machine having an undercarriage and a superstructure being pivotable relative to each other; in particular the invention can be applied on an excavator, A working machine is usually provided with a bucket, container or other type of implement for digging, lifting, carrying and/or transporting a load, For example, an excavator has a lift arm unit for raising and lowering an implement, such as a bucket. The excavator may have an undercarriage and a superstructure arranged on the undercarriage which superstructure can be pivoted relative the undercarriage. The lift arm is arranged on the superstructure and thereby loading and unloading the bucket can be performed at different positions by pivoting the superstructure. In addition, an excavator that is provided with wheels or caterpillar tracks is mobile.

For such an excavator, that has to be powered from an external power source during operation such as an electrically driven excavator, where an electric power cable is connected to the excavator by means of a power connection device, the movement of the excavator and/or pivoting of the superstructure relative to the undercarriage may be limited and there is also a risk of damaging the electric power cable when operating the excavator.

It is desirable to provide a power connection device, by which device the operational flexibility of a working machine can be improved.

The invention, according to an aspect thereof, is based on the insight that by the provision of a power connection device having a first power conductor member which is adapted to be pivotally arranged relative to the undercarriage and the superstructure about the substantially vertical pivot axis, it is possible to rotate the superstructure or the entire working machine while having a power cable extending in one and the same direction from an external power source to the same position of the working machine.

This in turn will increase the operational flexibility and secure a safe connection to the power source, and reduce the risk of damaging the power cable during operation of the working machine.

By "external power source" is meant a power source arranged outside the working machine at a distance from the working machine, which power source does not move together with the movement of the working machine. For example, the external power source can be a stationary electric power source where there is a need of transmitting electric energy from the power source to the working machine by means of an electric cable and a power connection means so as to power the working machine.

In one embodiment of the power connection device according to the invention, the first power conductor member is adapted to have a pivot range of approximately 360°, and preferably a pivot range exceeding 360°, i.e. the conductor member can be freely rotated relative to the undercarriage and the superstructure. This will further increase the operational flexibility.

According to a second aspect, the invention relates to a working machine. All features described herein with respect to the power connection device can be applied to the working machine according, to an aspect of the invention.

According to a third aspect, the invention relates to a system comprising a working machine according to the invention and an external power source for transmitting electric energy to the working machine.

Effects and advantages of the second and third aspects of the present invention are largely analogous to those described above in relation to the first aspect of the present invention.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
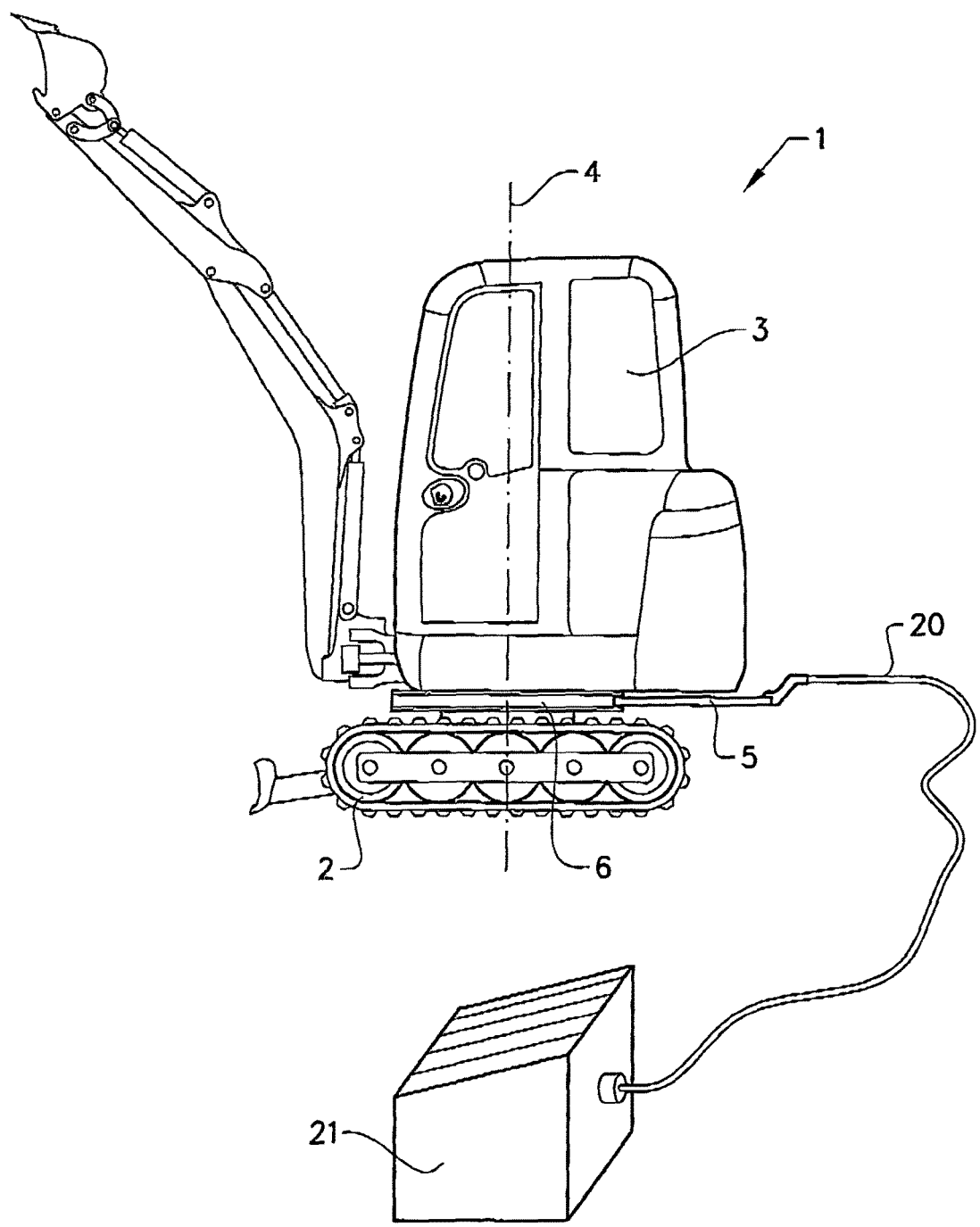
FIG. 1 is a side view illustrating an excavator having a power connection device according to the invention.

FIG. 1 is an illustration of a working machine 1 in the form of an excavator. The excavator is an example of a working machine where a power connection device according to the invention can be applied. The excavator has an undercarriage 2 and a superstructure 3. The undercarriage 2 and the superstructure 3 are pivotable relative to each other about a substantially vertical pivot axis 4. A power connection device 5 is arranged between the undercarriage 2 and the superstructure 3 and there is an electric cable 20 connected between the power connection device 5 and an external power source 21.

Figure 2:
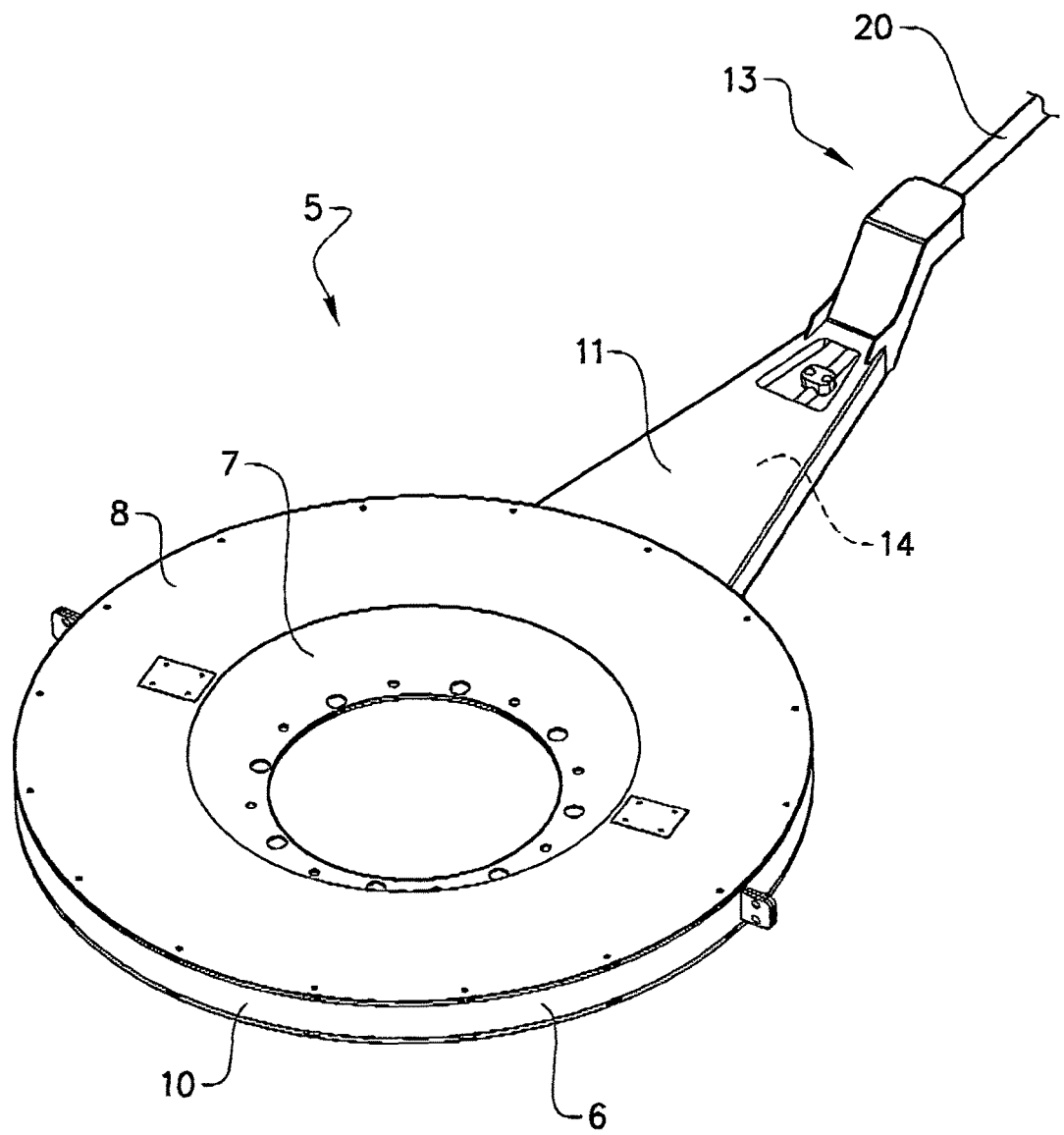
FIG. 2 shows in a perspective view one embodiment of the power connection device according to the invention.
Figure 3:
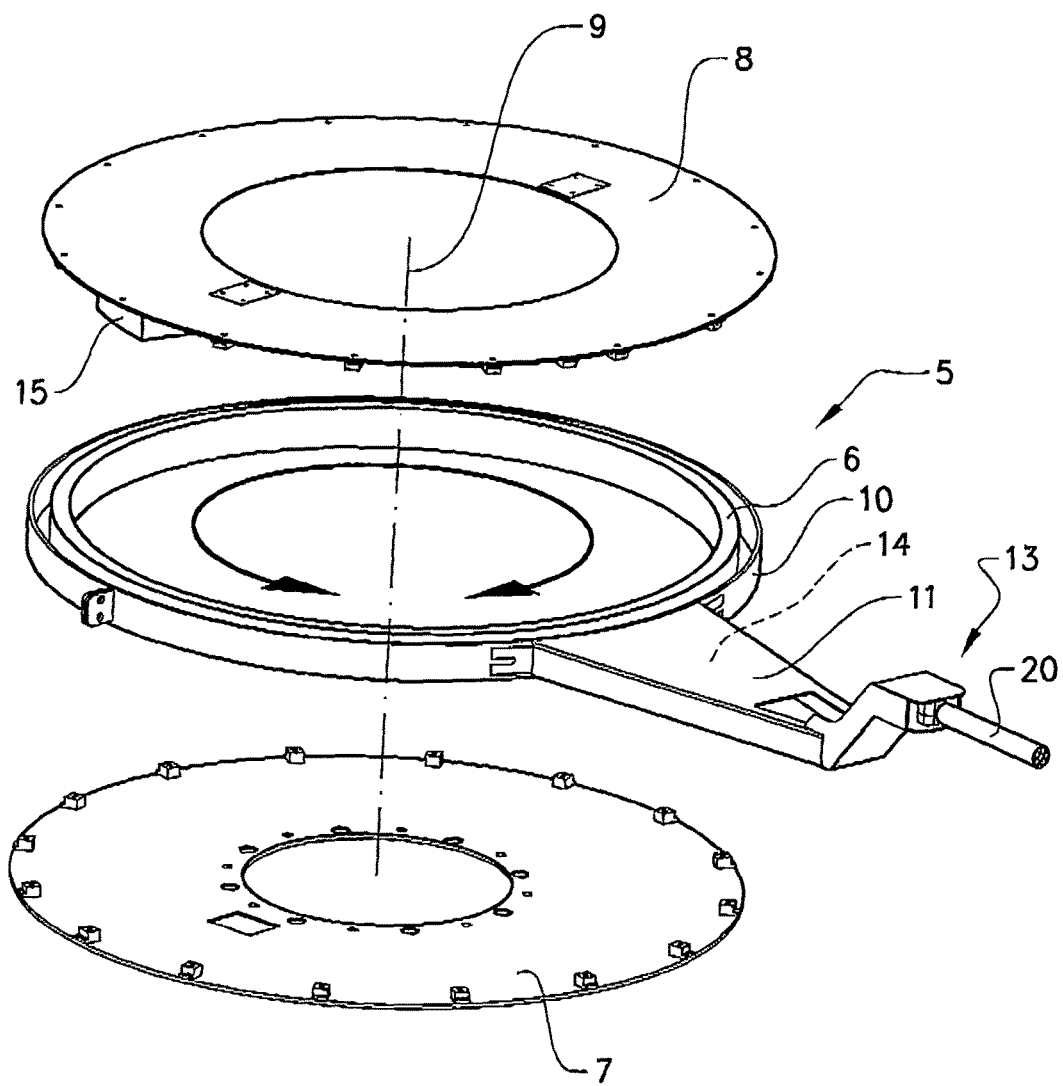
FIG. 3 shows in an exploded view the power connection device illustrated in FIG. 2.

One example embodiment of a power connection device 5 according to the invention is illustrated in FIGS. 2 and 3. The power connection device 5 comprises a first power conductor member 6 which is adapted to be pivotally arranged relative to an undercarriage and a superstructure of a working machine, in the embodiment illustrated this first power conductor member 6 is designed as an arc-shaped rail intended to be arranged in a space between the undercarriage and the superstructure of the working machine. Preferably, the first power conductor member 6 is constituted by one or more circular arc shaped conductor rails.

As an alternative the first power conductor member can be design as a swivel or a slip ring.

As appears from the exploded view in FIG. 3 the power connection device 5 can comprise a lower attachment component 7, such as a plate or disc, intended to be attached to a upper surface of the undercarriage and an upper attachment component 8, such as a plate or disc, intended to be attached to a lower surface of the superstructure. The first conductor member 6 is slidingly arranged between the lower and upper attachment components 7, 8 allowing the first power conductor member to to pivot relative to the lower and upper attachment components. One or more bearings can be used for allowing the first power conductor member 6 to pivot relative to the undercarriage and the superstructure. The pivot axis 9 of the first power conductor member 6 coincides with the pivot axis 4 (see FIG. 1) for rotation of the superstructure relative to the undercarriage. The first conductor member 6 is further preferably enclosed by a casing 10 in the form of a ring, for instance. The power connection device 5 can further comprise an arm 11 attached to the casing 10. In other words; the first conductor member 6, the casing 10 enclosing the first conductor member 6 and the arm 11 will be pivotable together making it possible to direct the arm in the desired direction independently of how the undercarriage and the superstructure are directed. The first power conductor member 6 can be adapted to have a pivot range of at least 180°, preferably 270°, and more preferably approximately 360° or more. By making the first power conductor member freely rotatable relative to the undercarriage and the superstructure, the operational flexibility can be optimized.

For powering the working machine, one end of an electric cable 20 is connected to the free end 13 of the arm 11 and the other end of the cable is connected to an external electric power source (illustrated in FIG. 1). Furthermore, electric wires 14 extend inside the arm 11 from the connection point (between the arm and the cable) to the first conductor member 6 for transmitting power from the power source.

Figure 4:
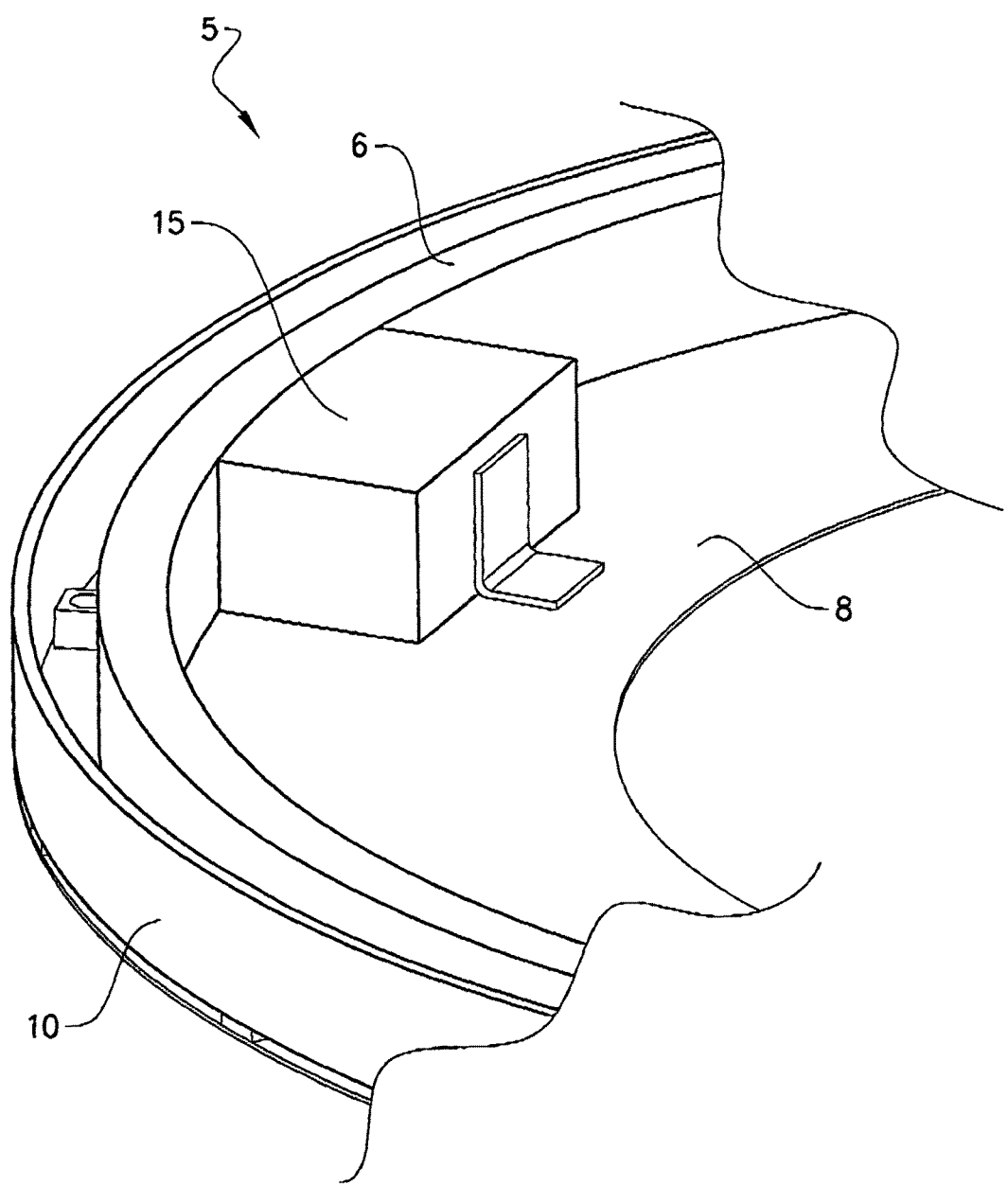
FIG. 4 shows details of the power connection device in FIGS. 2 and 3, and FIGS. 5a and 5b show an excavator in two different directions, where the excavator is provided with the power connection device according to the invention.

As illustrated in FIG. 4 the power connection device 5 preferably comprises a second power conductor member 15 for transmitting electric power between the first power conductor member 6 and the second power conductor member 15 while allowing a relative pivot motion between the first power conductor member 6 and the second power conductor member 15. For example, the second power conductor member 15 and the first power conductor member 6 can be adapted for sliding contact with each other. Another option is that the second power conductor member 15 and the first power conductor member 6 are adapted for transmitting power by induction therebetween.

The second power conductor member 15 can be a power collector adapted to be fixedly arranged on the undercarriage or the superstructure for transmitting electric power to an electric component arranged on the undercarriage or the super structure power. In the embodiment illustrated in FIG. 4 the second conductor member 15 is arranged on the superstructure by means of the upper attachment component 8. The power is then transmitted from the second conductor means 15 to any electrically driven component of the working machine by means of electric cables or wires. For example, the power can be used for rotation of the superstructure by means of an electric motor and operation of a lift arm, implements etc., arranged on the working machine.

Although the first power conductor member in the illustrated example has been described as a conductor rail or rails and the second power conductor member as a power collector component following the rail, in an alternative solution the power collector could be designed as a rail or rails and the first power conductor member could be designed as a component following the rails.

Figure 5A:
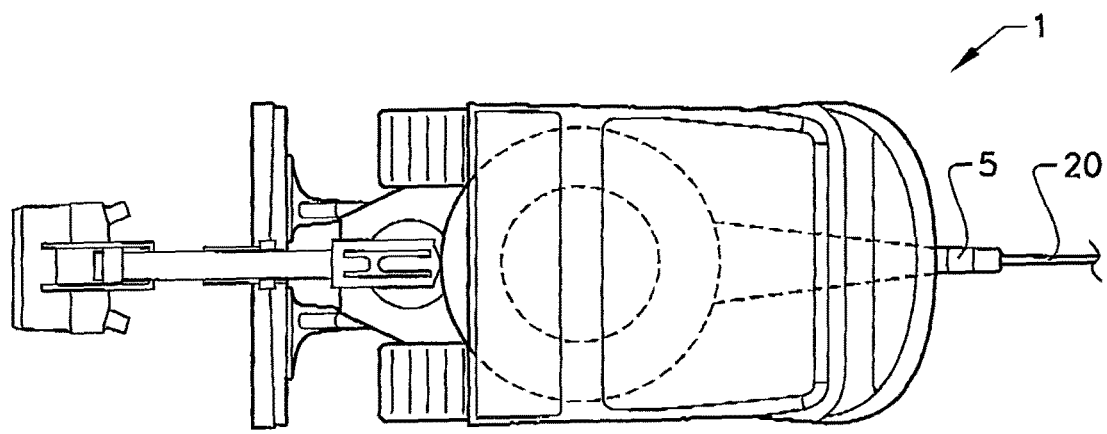
Figure 5B:
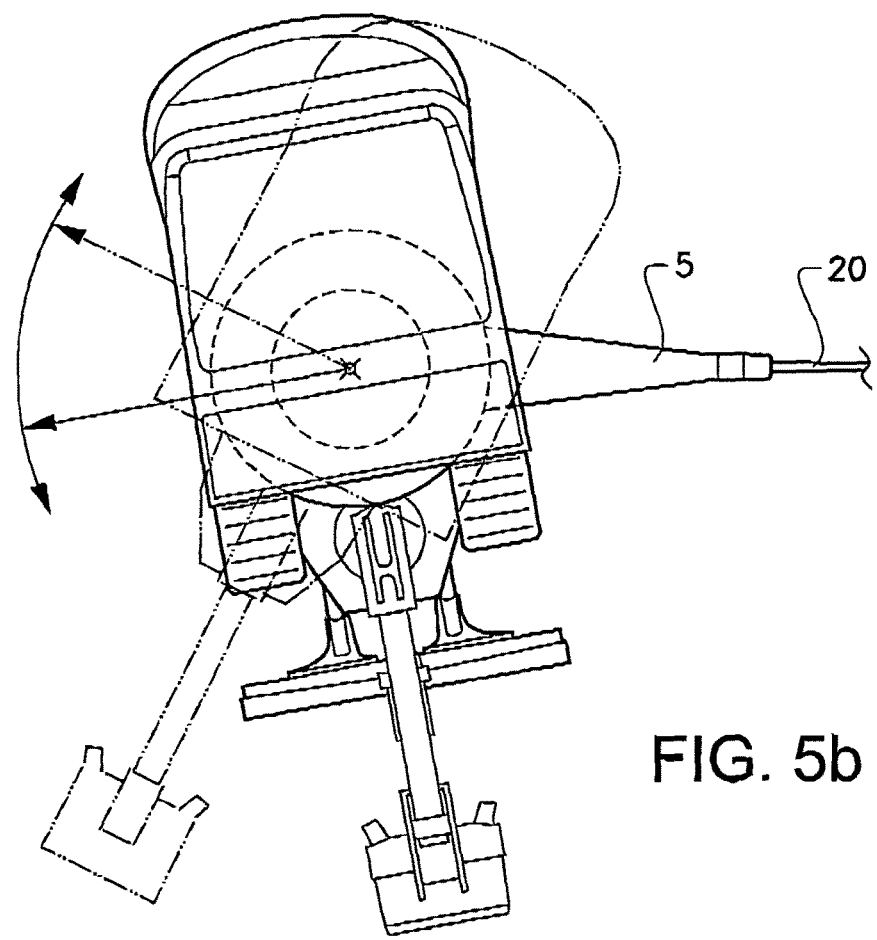

FIGS. 5a and 5b show in top Views an excavator 1 in operation, where the excavator 1 is provided with the power connection device 5 according to the invention. As illustrated the electric power cable 20 is pointing at one and the same direction in both figures, whereas the excavator 1 has been rotated in FIG. 5b as compared to FIG. 5a. Thus, the excavator 1 can be rotated while maintaining the direction of the electric power cable 20 without any interference from the electric power cable 20. The rotation of the excavator could be 360° while maintaining the direction of the electric power cable 20. The superstructure can also be rotated relative to the undercarriage as indicated by dotted lines in FIG. 5b. Although not illustrated, it is of course possible, for a certain direction of the excavator 1, to instead rotate the arm 11 of the power connection device 5 to the desired position for enabling connection to an electric power cable having any direction due to the position of the power source relative to the excavator.

It is to he understood that the present invention is not limited to the embodiments described above and illustrated in the drawings; rather, the skilled person will recognize that many changes and modifications may be made within the scope of the appended claims.

The invention claimed is:

1. A power connection device for transmitting electric power from an external power source to a working machine having an undercarriage and a superstructure, the undercarriage and the superstructure being pivotable relative to each other about a substantially vertical pivot axis, wherein the power connection device comprises
   a first power conductor member which is configured to be pivotally arranged relative to the undercarriage and the superstructure about the substantially vertical pivot axis,
   a lower attachment component configured to be attached to a upper surface of the undercarriage, and
   an upper attachment component configured to be attached to a lower surface of the superstructure, the first power conductor member being slidingly arranged between the lower and upper attachment components allowing the first power conductor member to pivot relative to the lower and upper attachment components.

2. A power connection device according to claim 1, wherein the first power conductor member is adapted to be arranged in a space between the undercarriage and the superstructure.

3. A power connection device according to claim 1, wherein the power connection device comprises a second power conductor member for transmitting electric power from the first power conductor member to the second power conductor member while allowing a relative pivot motion between the first power conductor member and the second power conductor member.

4. A power connection device according to claim 3, wherein the second power conductor member and the first power conductor member are adapted for sliding contact with each other.

5. A power connection device according to claim 3, wherein the second power conductor member and the first power conductor member are adapted for transmitting power by induction therebetween.

6. A power connection device according to claim 3, wherein the second power conductor member is a power collector adapted to be fixedly arranged on the undercarriage or the superstructure for transmitting electric power to an electric component arranged on the working machine.

7. A power connection device according to claim 1, wherein the first power conductor member is constituted by one or more circular arc shaped conductor rails.

8. A power connection device according to claim 1, wherein the power connection device comprises at least one bearing for allowing the first power conductor member to pivot relative to the undercarriage and the superstructure.

9. A power connection device according to claim 1, wherein the first power conductor member is adapted to have a pivot range of at least 180°.

10. A power connection device according to claim 1, wherein the first power conductor member is adapted to have a pivot range of at least 270°.

11. A power connection device according to claim 1, wherein the first power conductor member is adapted to have a pivot range of approximately 360° or more.

12. A working machine comprising
an undercarriage and a superstructure which are pivotable relative to each other about a substantially vertical pivot axis, and
a power connection device for transmitting electric power from an external power source to the working machine, wherein the power connection device comprises
a first power conductor member, the first power conductor member being pivotable relative to the undercarriage and the superstructure about the substantially vertical pivot axis,
a lower attachment component attached to a upper surface of the undercarriage, and
an upper attachment component attached to a lower surface of the superstructure, the first power conductor member being slidingly arranged between the lower and upper attachment components allowing the first power conductor member to pivot relative to the lower and upper attachment components.

13. A working machine according to claim 12, wherein the first power conductor member is arranged in a space between the undercarriage and the superstructure.

14. A working machine according to claim 12, wherein the first power conductor member has a pivot range of at least 180°.

15. A working machine according to claim 12, wherein the first power conductor member has a pivot range of at least 270°.

16. A working machine, according to claim 12, wherein the first power conductor member has a pivot range of approximately 360° or more.

* * * * *